United States Patent
Rakotoarivony et al.

(10) Patent No.: US 12,430,939 B2
(45) Date of Patent: Sep. 30, 2025

(54) MACHINE LEARNING INTEGRATION IN ROBOTIC PROCESS AUTOMATION

(71) Applicant: SAP SE, Walldorf (DE)

(72) Inventors: Louis Rakotoarivony, Verrières-le-Buisson (FR); Xiaohui Xue, Courbevoie (FR)

(73) Assignee: SAP SE, Walldorf (DE)

( * ) Notice: Subject to any disclaimer, the term of this patent is extended or adjusted under 35 U.S.C. 154(b) by 343 days.

(21) Appl. No.: 18/180,764

(22) Filed: Mar. 8, 2023

(65) Prior Publication Data

US 2024/0304017 A1    Sep. 12, 2024

(51) Int. Cl.
*G06V 30/414*    (2022.01)
*G06V 10/82*    (2022.01)

(52) U.S. Cl.
CPC ............ *G06V 30/414* (2022.01); *G06V 10/82* (2022.01)

(58) Field of Classification Search
CPC ....... G06V 10/82; G06V 30/414; G06N 20/00
See application file for complete search history.

(56) References Cited

U.S. PATENT DOCUMENTS

| | | | |
|---|---|---|---|
| 12,153,904 B2 * | 11/2024 | Silverstein | G06F 8/38 |
| 12,154,358 B2 * | 11/2024 | Gligan | G06F 40/186 |
| 2024/0012387 A1 * | 1/2024 | Stan | G05B 19/4155 |

OTHER PUBLICATIONS

Ribeiro, et al. (Robotic Process Automation and Artificial Intelligence in Industry), pp. 51-58 (Year: 2021).*

* cited by examiner

*Primary Examiner* — Daniel G Mariam
(74) *Attorney, Agent, or Firm* — Fountainhead Law Group, PC

(57) ABSTRACT

Automation of robotic process automation design may be improved by integrating machine learning. A screenshot of a user interface of an application to be automated is captured. Then a selection of an area of the screenshot is determined. The area is provided as input to a document information extraction machine learning model configured to output labels and coordinates for user interface elements in the area. Labels for respective user interface elements of the one or more user interface elements and a respective set of coordinates are identified for each of the user interface elements. The user interface elements and respective criteria are declared as robotic process automation entities in a robotic process automation object model. Actions are assigned to the robotic process automation elements. And then the actions are performed on the application to be automated based on the respective criteria for the robotic process automation elements.

20 Claims, 14 Drawing Sheets

MACHINE LEARNING INTEGRATION IN ROBOTIC PROCESS AUTOMATION

BACKGROUND

The present disclosure pertains to robotic process automation and in particular to integrating machine learning into the design of a bot to perform robotic process automation on an application.

Robotic Process Automation (RPA) is a tool that can be used to accelerate digital transformation of computer processes by automatically replicating actions of a computer user. RPA software can be configured to do basic tasks across multiple software applications, just as human computer users do. The RPA robot can be configured to click through a workflow with multiple steps and applications, such as filing a form, uploading data or updating a spreadsheet. RPA software is designed to reduce the burden of repetitive, simple tasks on users.

Design of an RPA robot may be performed in a capture phase and an automation design phase. The capture phase may involve declaration of applications, declaration of the application's screens and user interface (UI) elements of each screens on which the robot will interact. The automation design phase may involve assembling sets of actions (e.g., open, click, set, get, etc.) on each of declared applications, screens, and UI elements that the robot will execute.

While RPA robots reduce manual tasks and save time during execution, design of RPA robots may also be time consuming and require numerous manual tasks to be performed by human users. There is a need for improved RPA robot design.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to Some embodiments provide a computer system, comprise one or more processors and one or more machine-readable medium coupled to the one or more processors. The machine-readable medium store computer program code comprising sets instructions executable by the one or more processors. The instructions are executable to capture a screenshot of a first user interface of a first application. The screenshot includes one or more user interface elements displayed by the first application. The instructions are further executable to display the screen shot in a second user interface of a second application. The instructions are further executable to determine a selection of an area of the screenshot. The selection is made using the second user interface. The area including the one or more user interface elements. The instructions are further executable to provide the area of the screenshot as input to a document information extraction machine learning model configured to output labels and coordinates for the one or more user interface elements. The instructions are further executable to identify, using the labels and bounding boxes output from the document information extraction machine learning model, labels for respective user interface elements of the one or more user interface elements and a respective set of coordinates for each of the one or more user interface elements. The respective set of coordinates locate the corresponding user interface element within the screenshot. The instructions are further executable to declare the one or more user interface elements and respective criteria for the one or more elements as one or more robotic process automation entities in a robotic process automation object model. The respective criteria for a particular user interface element including the respective label and the respective set of coordinates for the particular user interface element. The instructions are further executable to assign one or more actions to the one or more robotic process automation elements. The instructions are further executable to perform the one or more actions on the first application based on the respective criteria for the one or more robotic process automation elements.

Some embodiments provide one or more non-transitory computer-readable medium storing computer program code comprising sets of instructions. The computer program code comprises sets of instructions to capture a screenshot of a first user interface of a first application. The screenshot includes one or more user interface elements displayed by the first application. The computer program code further comprises sets of instructions to display the screen shot in a second user interface of a second application. The computer program code further comprises sets of instructions to determine a selection of an area of the screenshot, the selection made using the second user interface, the area including the one or more user interface elements. The computer program code further comprises sets of instructions to provide the area of the screenshot as input to a document information extraction machine learning model configured to output labels and coordinates for the one or more user interface elements. The computer program code further comprises sets of instructions to identify, using the labels and bounding boxes output from the document information extraction machine learning model, labels for respective user interface elements of the one or more user interface elements and a respective set of coordinates for each of the one or more user interface elements. The respective set of coordinates locating the corresponding user interface element within the screenshot. The computer program code further comprises sets of instructions to declare the one or more user interface elements and respective criteria for the one or more elements as one or more robotic process automation entities in a robotic process automation object model. The respective criteria for a particular user interface element including the respective label and the respective set of coordinates for the particular user interface element. The computer program code further comprises sets of instructions to assign one or more actions to the one or more robotic process automation elements. The computer program code further comprises sets of instructions to perform the one or more actions on the first application based on the respective criteria for the one or more robotic process automation elements.

Some embodiments provide a computer-implemented method. The method comprises capturing a screenshot of a first user interface of a first application. The screenshot including one or more user interface elements displayed by the first application. The method further comprises displaying the screen shot in a second user interface of a second application. The method further comprises determining a selection of an area of the screenshot. The selection made using the second user interface, the area including the one or more user interface elements. The method further comprises providing the area of the screenshot as input to a document information extraction machine learning model configured to output labels and coordinates for the one or more user interface elements. The method further comprises identifying, using the labels and bounding boxes output from the document information extraction machine learning model, labels for respective user interface elements of the one or more user interface elements and a respective set of coordinates for each of the one or more user interface elements. The respective set of coordinates locating the corresponding user interface element within the screenshot. The method further comprises declaring the one or more user interface elements and respective criteria for the one or more elements as one or more robotic process automation entities in a robotic process automation object model. The respective criteria for a particular user interface element including the respective label and the respective set of coordinates for the particular user interface element. The method further comprises assigning one or more actions to the one or more robotic process automation elements. The method further comprises performing the one or more actions on the first application based on the respective criteria for the one or more robotic process automation elements.

The following detailed description and accompanying drawings provide a better understanding of the nature and advantages of the present disclosure.

DETAILED DESCRIPTION

Figure 1:
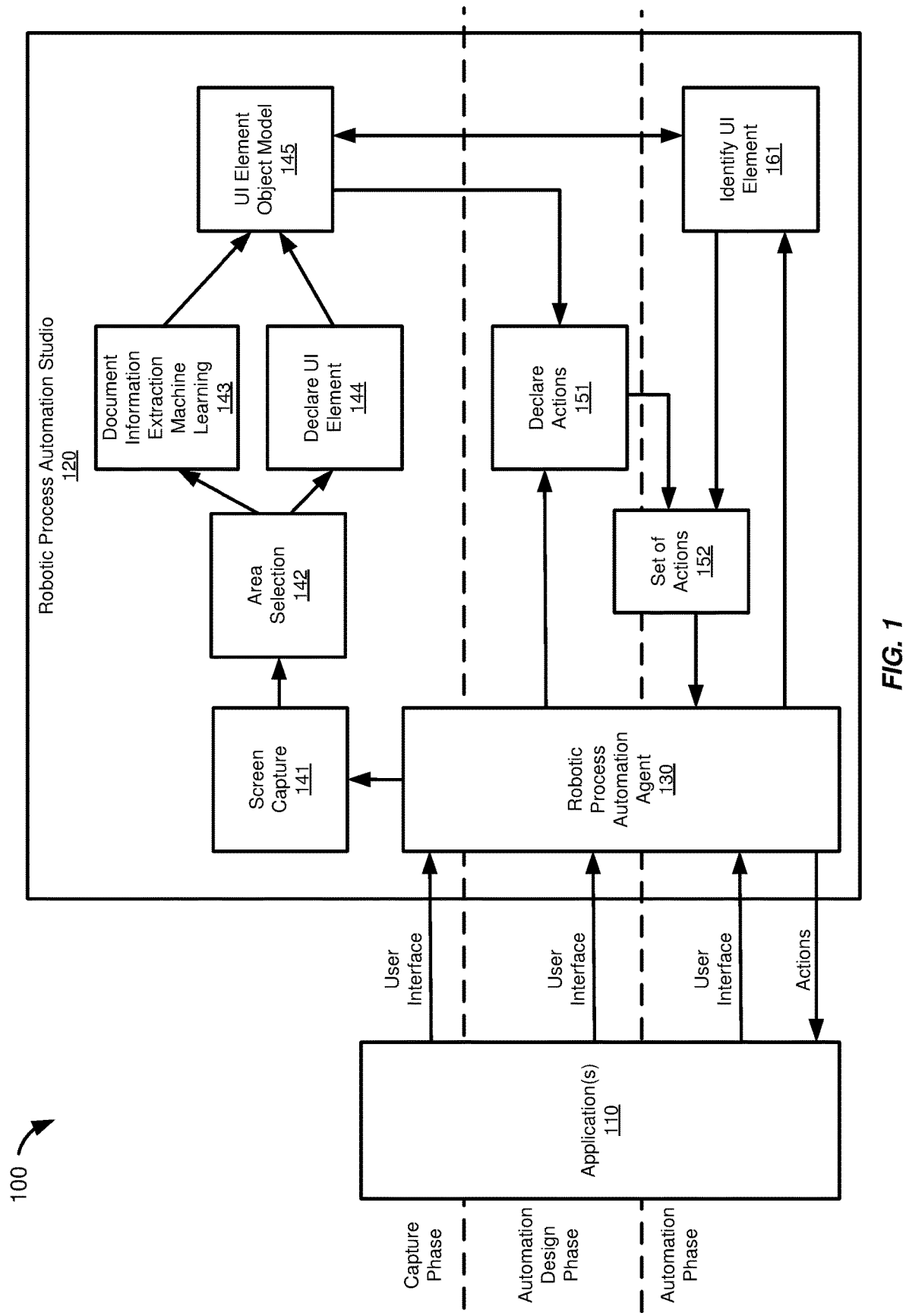
FIG. 1 shows a diagram of a capture phase using document information extraction machine learning, an automation design phase, and an automation phase of robotic process automation, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth." "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, design of an RPA robot may be performed in a capture phase and an automation design phase. The capture phase may involve declaration of applications, declaration of the application's screens and user interface (UI) elements of each of the screens on which the robot will interact. The automation design phase may involve assembling sets of actions (e.g., open, click, set, get, etc.) on each of declared applications, screens, and UI elements that the robot will execute.

Robotic process automation design and execution can involve an RPA Agent running on a local machine which executes actions on a remote machine. This RPA agent may be configured to enable a user to declare applications, screens, and UI elements. Depending on the technology used by the application (e.g., a web application, Java, etc.), the RPA Agent may be able to inspect the running application and extract the UI Components structure (e.g., hierarchical structure of UI components, properties of each components like position, name, etc.).

However, in other cases it may not be possible for the RPA agent to acquire the structure of the application. For instance, the technology used by the application is not supported by the RPA Agent or the application is running on a remote machine on which and the agent is not installed (e.g., lack of authorization, security reasons, etc.). In such cases, the remote machine can be accessed using remote desktop software. Remote desktop software allows a desktop environment to be run remotely off of one system while being displayed on a separate client device. For example, remote desktop software may capture the mouse and keyboard inputs from the local computer (client) and sends them to the remote computer, which in turn sends the display commands to the local computer. In the context of robotic process automation, the remote desktop software sends actions initiated by the RPA robot to the remote computer.

To overcome this lack of application structure for certain applications, a technology called "Surface Automation" can be applied. Here, the term "surface" refers to a situation where the underlying structure of the application is not known and the automation relies on the UI display of the application (e.g., its "surface"). In surface automation, the RPA agent takes a screenshot of the application displayed on the local machine. From the image, the RPA Agent applies an optical character recognition (OCR) algorithm to identify all text in the screen, which can then be suggested as UI element to the user. Then the user can declare a different areas on the image where he needs an interaction with the application. For example, the user can declare rectangle coordinates of an area where an input field will be filled during the robotic process automation.

However, declaring areas for robotic process automation may be time consuming and tedious, especially if the application is complex. This is because the user designing the robotic process automation robot must declare manually each area.

To address these issues, the present disclosure provides techniques for designing a robotic process automation robot that utilizes a machine learning model to automatically identify user interface elements that may be declared for robotic process automation. Features and advantages of these techniques are that the user does not need to manually declare each area or UI element. Instead, the user can be presented with a list of automatically identified areas and UI elements which can then be selected from and declared as needed.

In some embodiments, a document information extraction machine learning model may be used to identify areas and UI elements from a screenshot of an application, or from a selected area within the screenshot (e.g., selected by the user or automatically selected computer). The document information extraction machine learning model may be trained to extract information from documents (e.g., PDF files, image files, word processing documents, etc.), including the structure of the document. For instance, from a PDF Invoice, the document information extraction machine learning model may be configured to output the Customer name and address, the invoice amount, the list of products, etc. The document extraction machine learning model may also be configured to output coordinates (e.g., bounding boxes) corresponding to these elements. The present disclosure utilizes this document information extraction machine learning model to perform UI element recognition, which can then be used to declare a set of UI elements for RPA. This reduces the manual effort needed to be performed by human users in designing the RPA robot. For example, the user may select an area of the application screenshot and the RPA software automatically identifies images of UI elements in this area using machine learning and then suggests a list of labeled areas that the user can declare for use in RPA actions.

If a UI element is not recognized by the system, the user can manually declare it and define its type and the system can store this information such that if the same zone appears in another screen capture, the UI element will be suggested to the user. For example, the RPA design system may not be able to recognize a button with a specific rendering and the user can declare it as a button area afterwards.

FIG. 1 shows a diagram of a capture phase using document information extraction machine learning, an automation design phase, and an automation phase of robotic process automation, according to an embodiment. This design and implementation of robotic process automation may be provided by Robotic Process Automation (RPA) Studio software 120 including a robotic process automation agent 130. The RPA studio 120 may be able to configure robotic process automation for one or more applications 110.

The RPA studio 120 may be a Web Application in which the user can declare application, screen, and user interface (UI) elements of the screen for use in robotic process automation. The RPA Studio 120 maintains an Object Model 145 of these entities. Each object may have one or more corresponding criteria, which are used by the RPA agent 130 (or by another engine that is executing the RPA bot) to identify the UI element, and then apply actions defined in the automation.

For the "surface automation" technology, there may be two kinds of elements: "labels" which are recognized text from the screenshot (e.g., Text, Line Paragraph), and "area coordinates", which define an area that user defined in the image. The criteria used within surface automation technology are based on coordinate of elements. In some embodiments the RPA Studio 120 may communicate with various microservices to save a project containing the screenshot capture and the RPA robot definition.

The RPA agent 130 may be an on-premise application running on the same machine as the application the user wants to automate, or it application may be operating on a remote machine. With the "surface automation" technology, its role is to take screen capture 141 of the application's UI screens and perform text recognition of an image and send the result to the RPA Studio 120. The RPA Studio 120 may include an optical character recognition (OCR) engine for recognizing text.

The RPA Studio 120 also includes a document information extraction machine learning model 143. This machine learning model 143 can be used to process large amounts of business documents that have content in headers and tables. The machine learning model 143 can be access using a service via a REST API. In some embodiments, an extension that can be added is a set of UI controls library in order to identify them in an application screen.

With the main components of the RPA studio 120 described, the capture, automation design, and automation phases are now described. In the capture phase, a user interface of one or more applications 110 may be provided to a robotic process automation (RPA) agent 130. For instance, the RPA agent 130 may access the application 110 using remote desktop software. The RPA agent 130 may initiate a screen capture 141 of the user interface. This screen capture may be displayed to a user of the RPA studio 120. The user may perform area selection 142 to select a particular area (e.g., clicking and dragging a mouse to define a bounding box) of the captured screenshot. The area may then be provided to a document information extraction machine learning model 143 which is configured to receive the area of the captured screenshot as input and output labels and coordinates for the user interface elements displayed in the screenshot. The user may also use an option to manually Declare a UI Element 144 for any elements not automatically recognized such that these UI elements will be automatically recognized later. The user interface elements may be a table, a table header, a table column header, a table row, a table cell, a button, an input field, a menu, a tool bar, an icon, a tab, a text box, a list box, a check box, a window, or a dialog, for example. The respective labels and coordinates for the elements may be stored in a UI Element Object Model 145.

In the RPA Studio 120, the user can select which UI elements to declare as RPA elements. Then, in the automation design phase, the user can declare actions 151, which involves assigning or assemble sets of actions 152 (e.g., open, click, set, get, etc.) on each of the declared UI elements. The RPA agent 130 can then execute these actions in the automation phase. For example, the RPA agent 130 can access a user interface of the applications, identify the UI elements 161, and then implement the set of actions 152 corresponding to those elements.

Thus, the document information extraction machine learning model 143 may advantageously be used to reduce the number of manual tasks (e.g., declaring UI element 144) performed in the capture phase.

Figure 2:
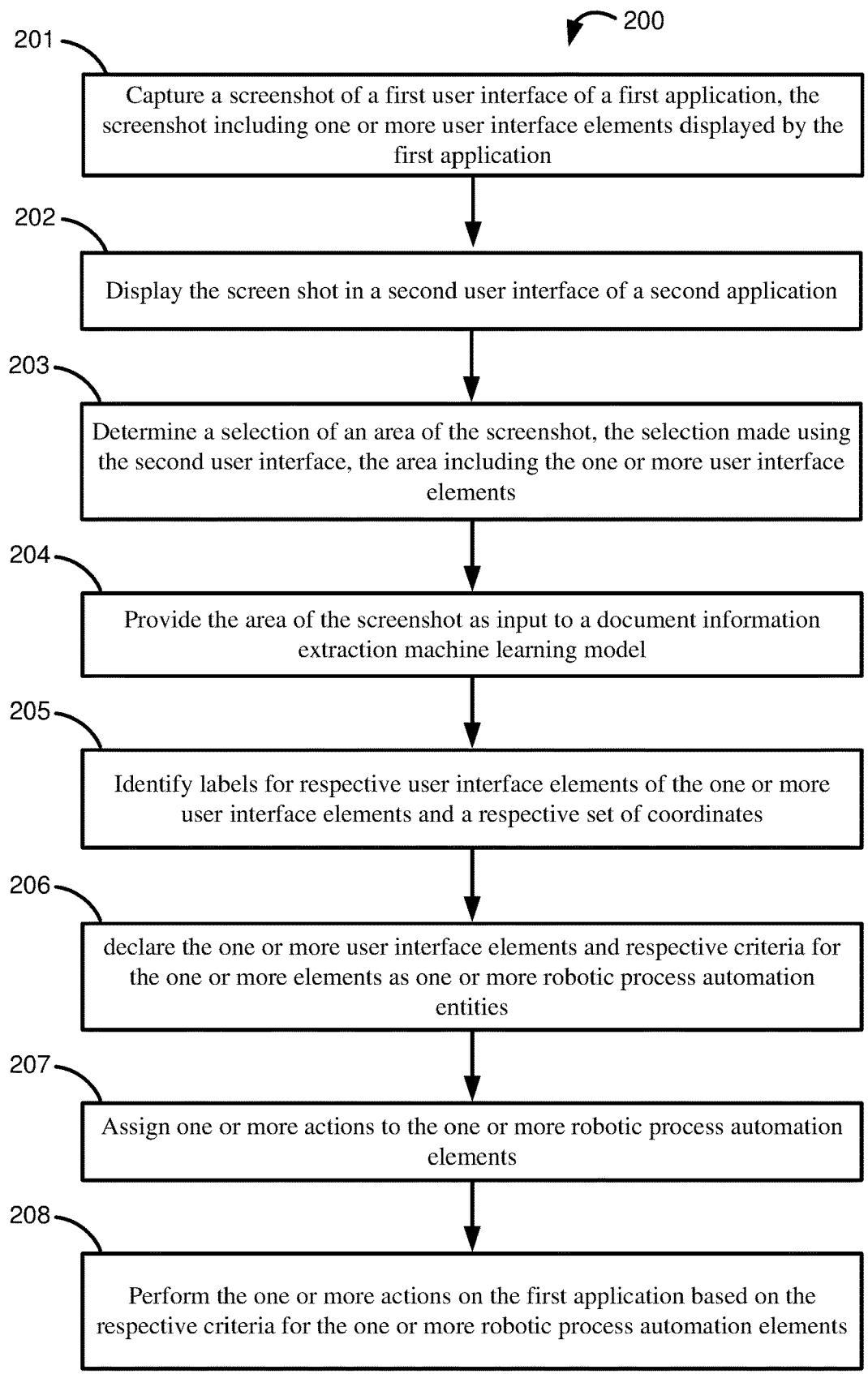
FIG. 2 shows a diagram of a method for robotic process automation design using document information extraction machine learning, according to an embodiment.

FIG. 2 shows a diagram of a method for robotic process automation design using document information extraction machine learning, according to an embodiment.

At 201, the capture a screenshot of a first user interface of a first application, the screenshot including one or more user interface elements displayed by the first application. An example of capturing a screenshot is described below with respect to FIG. 3 and FIG. 8.

Figure 3:
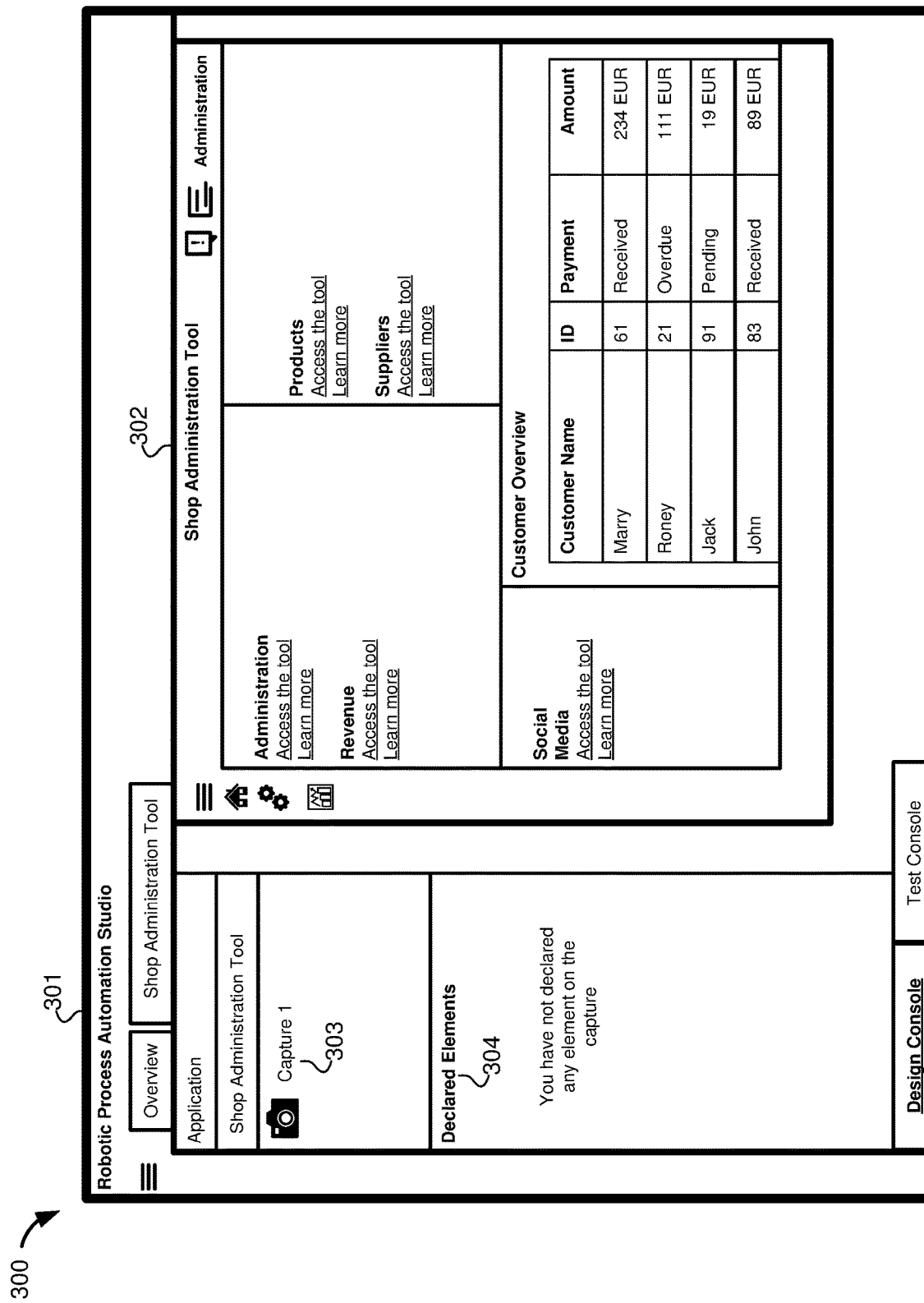
FIG. 3 shows a diagram of an exemplary user interface for a robotic process automation studio used to design an RPA robot for an exemplary shop administration tool user interface, according to an embodiment.
Figure 8:
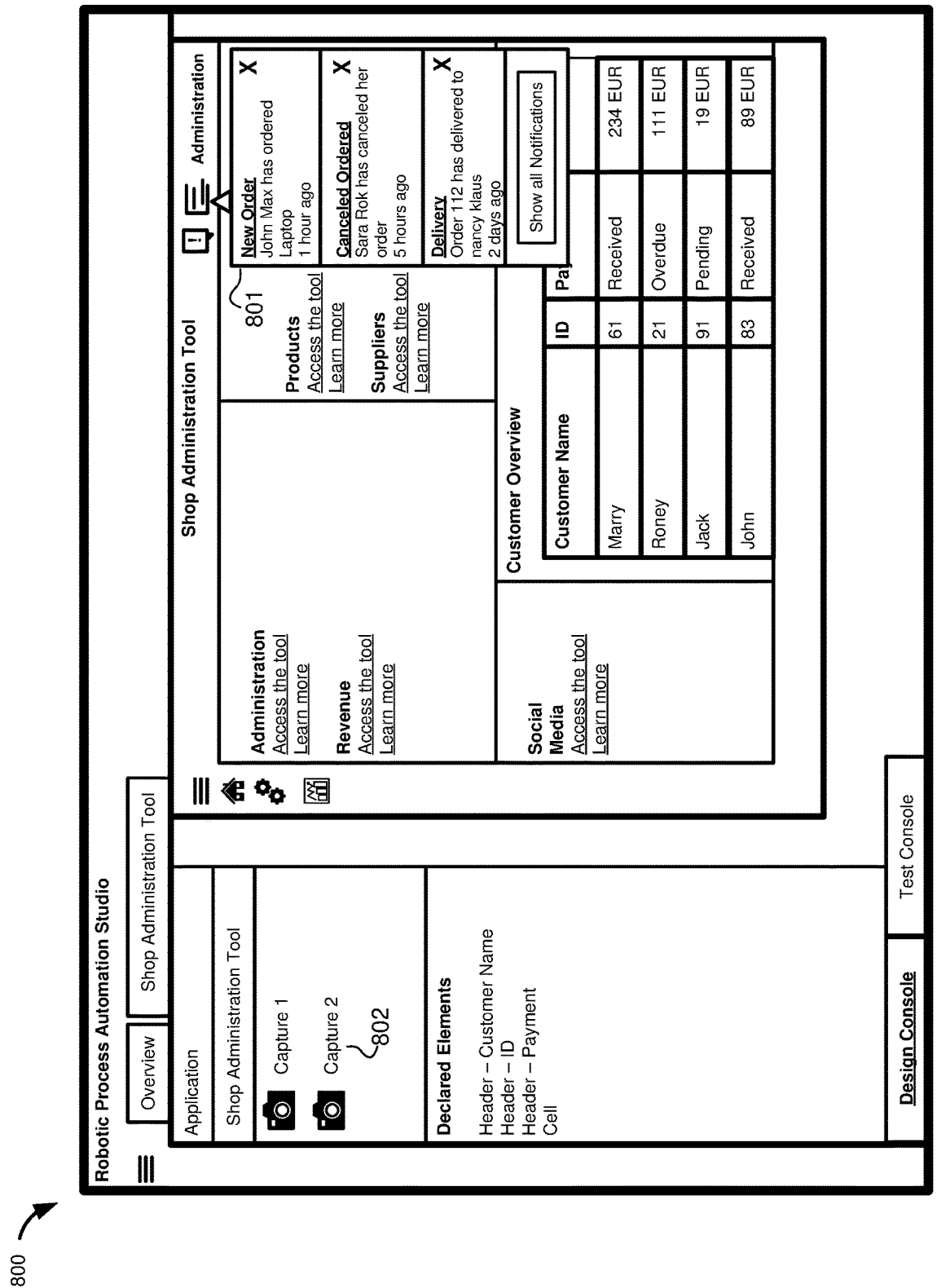
FIG. 8 shows a diagram of a screen capture including a notification area in the shop administration tool UI, according to an embodiment.

At 202, display the screenshot in a second user interface of a second application. An example of displaying the screenshot in a second user interface of a second application (e.g., the RPA Studio) is shown in FIG. 3 and FIG. 8.

Figure 4:
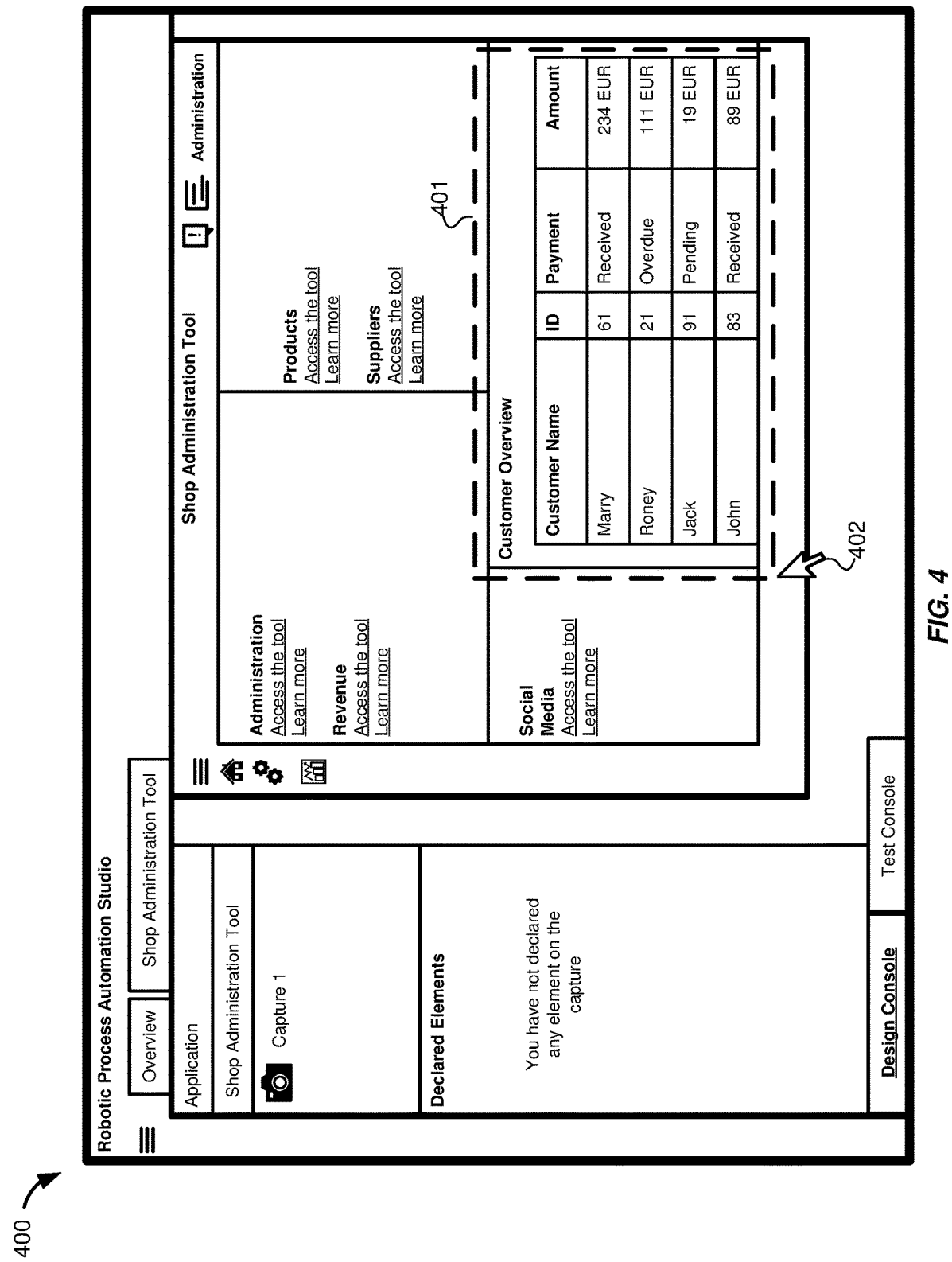
FIG. 4 shows a diagram of a selection of an area of a screen capture of the shop administration tool user interface, according to an embodiment.
Figure 9:
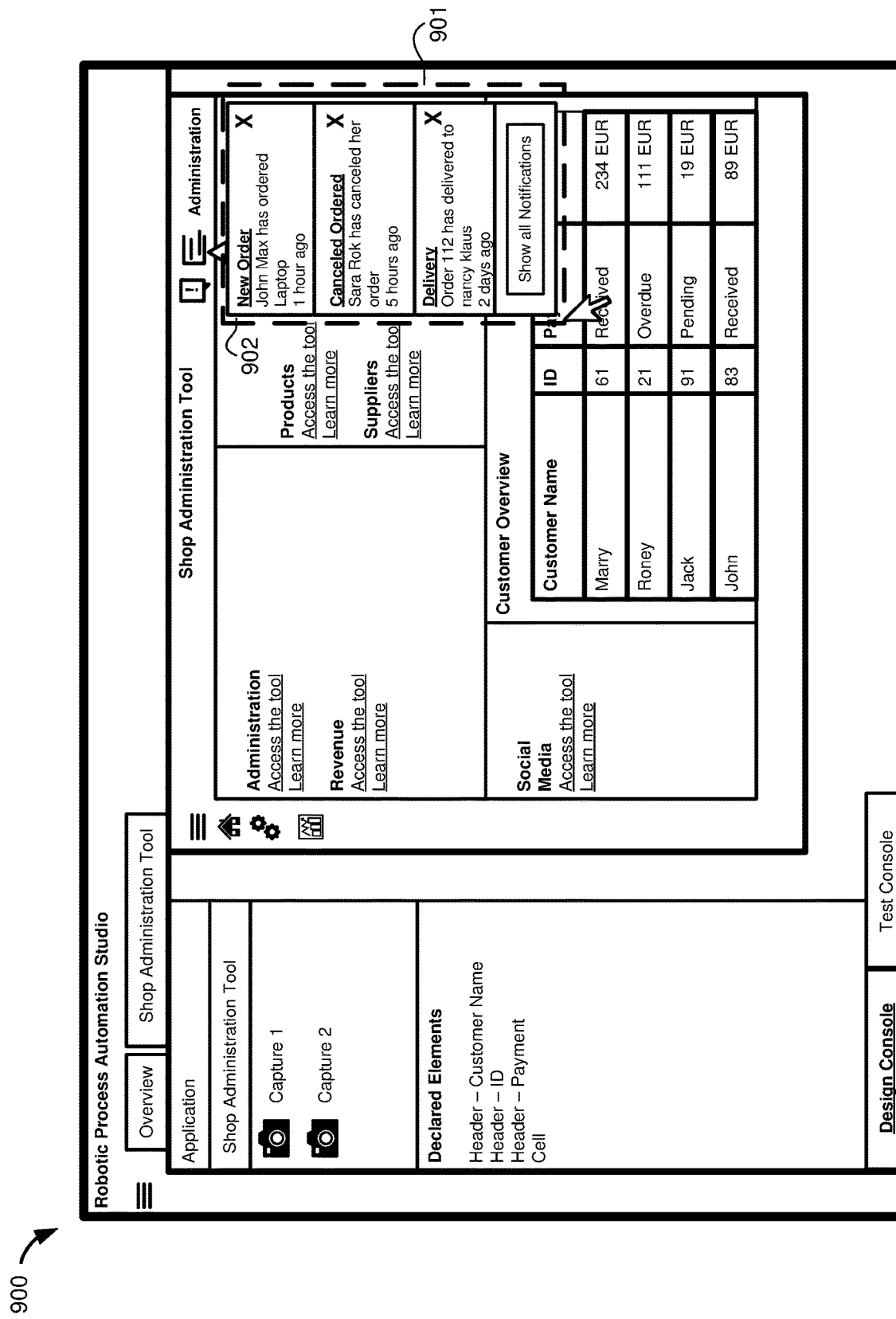
FIG. 9 shows a diagram of a selection of the notification area, according to an embodiment.

At 203, determine a selection of an area of the screenshot, the selection made using the second user interface, the area including the one or more user interface elements. An example of such a selection is shown in FIG. 4 and FIG. 9.

At 204, provide the area of the screenshot as input to a document information extraction machine learning model. Providing the screen shot as input to a document information extraction machine learning model is described above with respect to FIG. 1 and described below with respect to FIG. 14.

Figure 6:
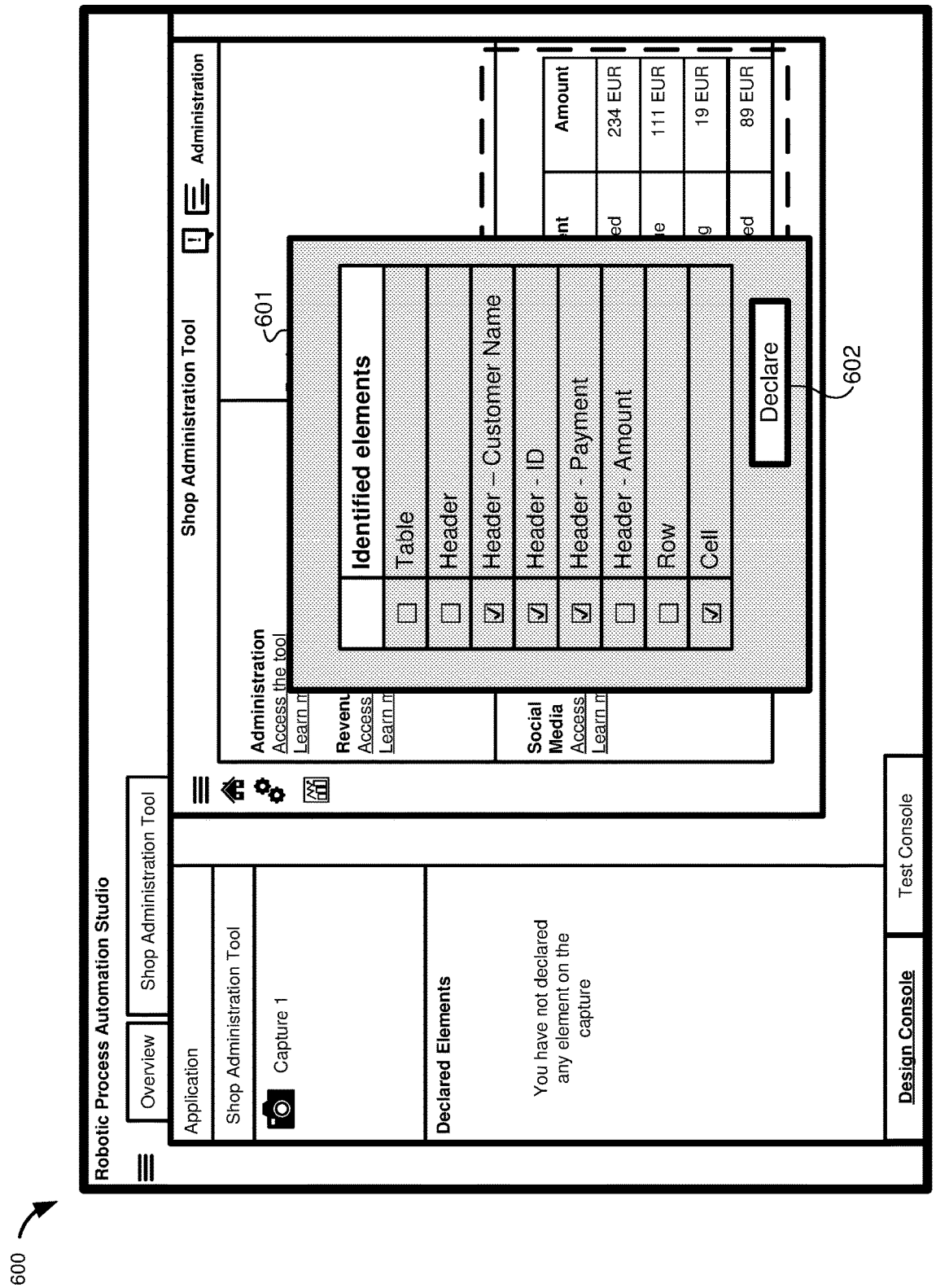
FIG. 6 shows a diagram of selection menu for user interface elements automatically identified by inputting the selected area of the screenshot to a document information extraction machine learning model, according to an embodiment.
Figure 10:
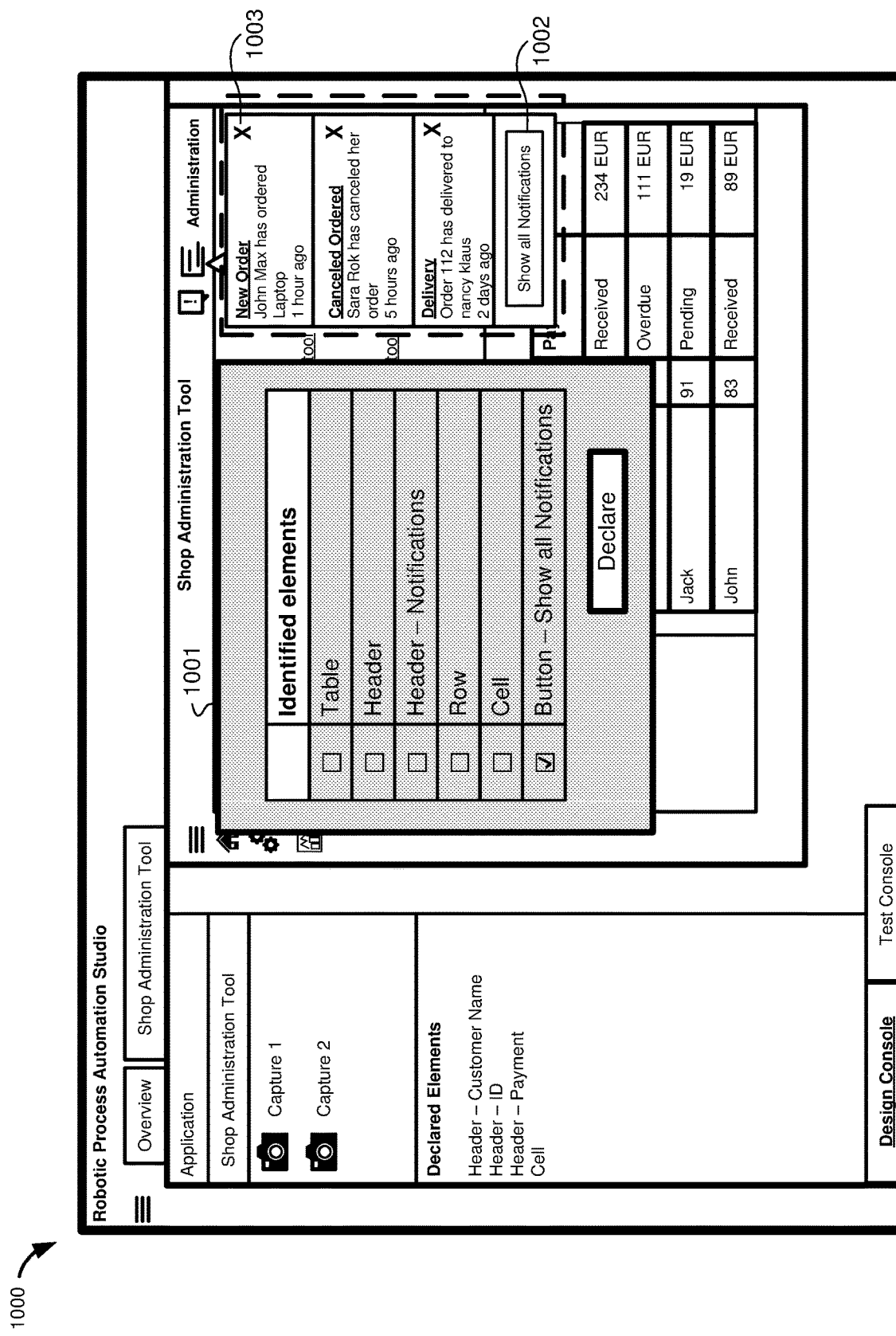
FIG. 10 shows a diagram of a selection menu for some of the user interface elements which were automatically identified, according to an embodiment.
Figure 12:
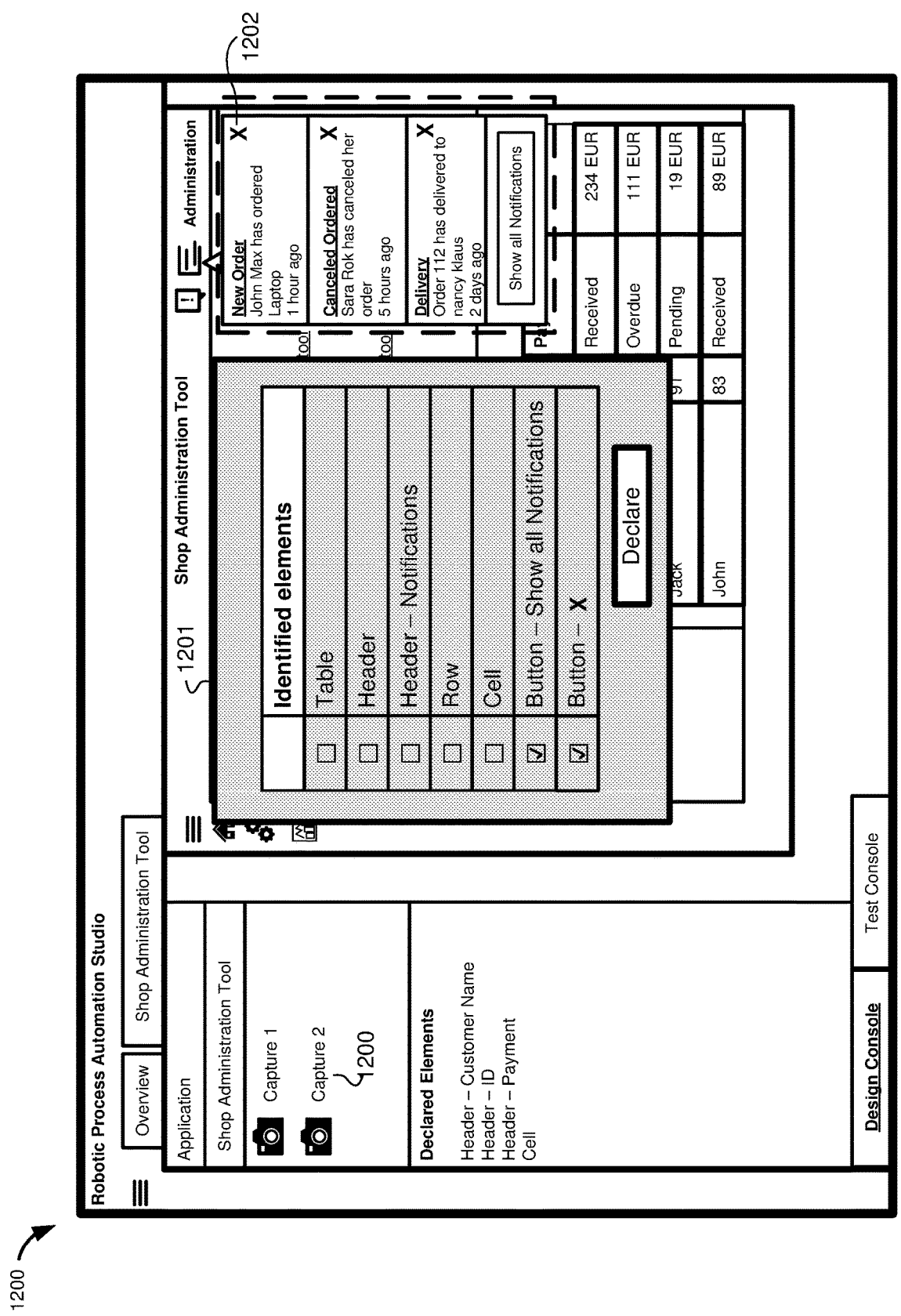
FIG. 12 shows a diagram of the button, which was manually declared now being automatically identified, according to an embodiment.

At 205, identify labels for respective user interface elements of the one or more user interface elements and a respective set of coordinates. Such identified labels are shown in FIG. 6, FIG. 10, and FIG. 12.

Figure 7:
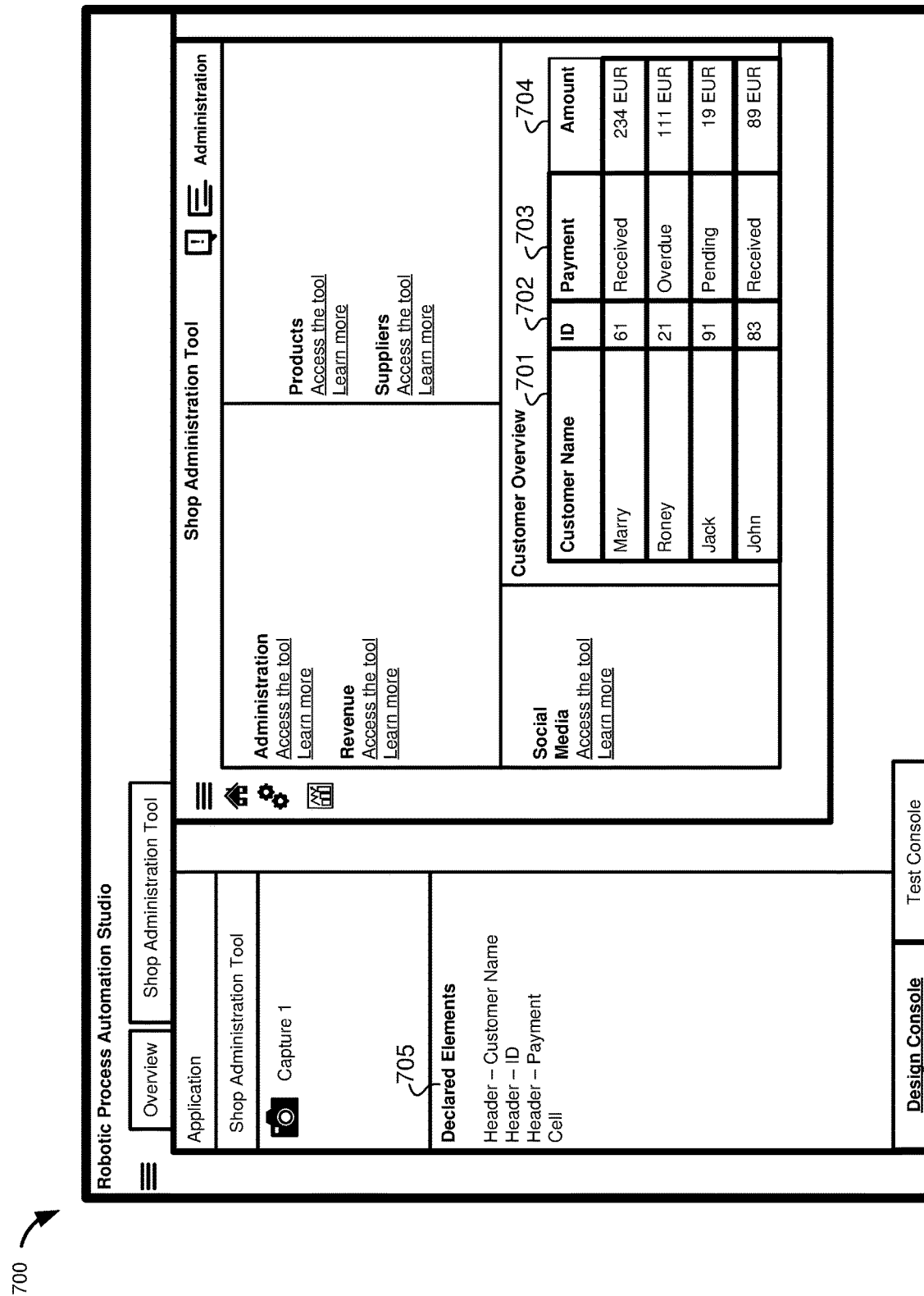
FIG. 7 shows a diagram of the shop administration tool user interface with the UI elements that were selected in the menu being highlighted with bold lining indicating that they were declared as RPA elements, according to an embodiment.
Figure 13:
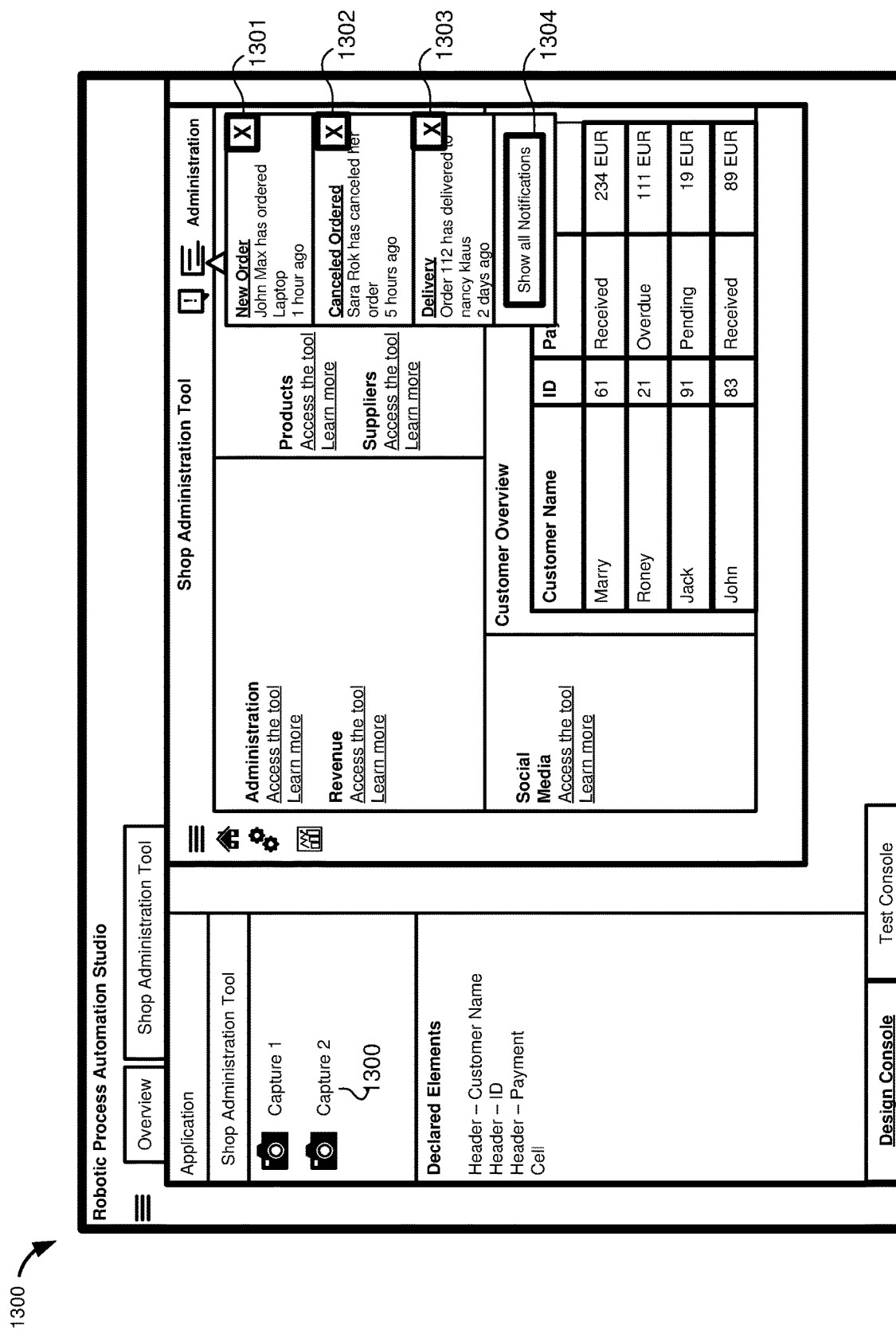
FIG. 13 shows a diagram of the shop administration tool UI with the UI elements that were selected in the menu being highlighted with bold lining indicating that they were declared as RPA elements, according to an embodiment.

At 206, declare the one or more user interface elements and respective criteria for the one or more elements as one or more robotic process automation entities. Such declared elements are shown in FIG. 7 and FIG. 13.

At 207, assign one or more actions to the one or more robotic process automation elements. For example, the RPA studio described below may be used to assign actions to elements declared in the RPA Studio for automating the Shop Administration Tool software.

At 208, perform the one or more actions on the first application based on the respective criteria for the one or more robotic process automation elements. For example, actions may be defined in the RPA Studio software described below and these actions may be implemented and carried out on the remote computer running the Shop Administration Tool software.

FIGS. 3-13 show an example of automatically declaring user interface elements of a shop administration tool as robotic process automation elements using a robotic process automation studio software.

FIG. 3 shows a diagram 300 of an exemplary user interface 301 for a robotic process automation studio used to design an RPA robot for an exemplary shop administration tool user interface 302, according to an embodiment. This diagram shows the user capturing a screenshot (labeled as Capture 1, 303 in FIG. 3) of an application's screen. At this point, there are no declared elements 304 in the RPA studio software. As shown in the following figures, the user will be able to select from UI element automatically identified using a document information extraction machine learning model and then manually declare any elements that were not recognized such that they are automatically recognized later.

FIG. 4 shows a diagram 400 of a selection 401 of an area of a screen capture of the shop administration tool user interface, according to an embodiment. The user may select the area 401 of the image by using a mouse or pointer 402 to click and drag a box to define the area 401.

Figure 5:
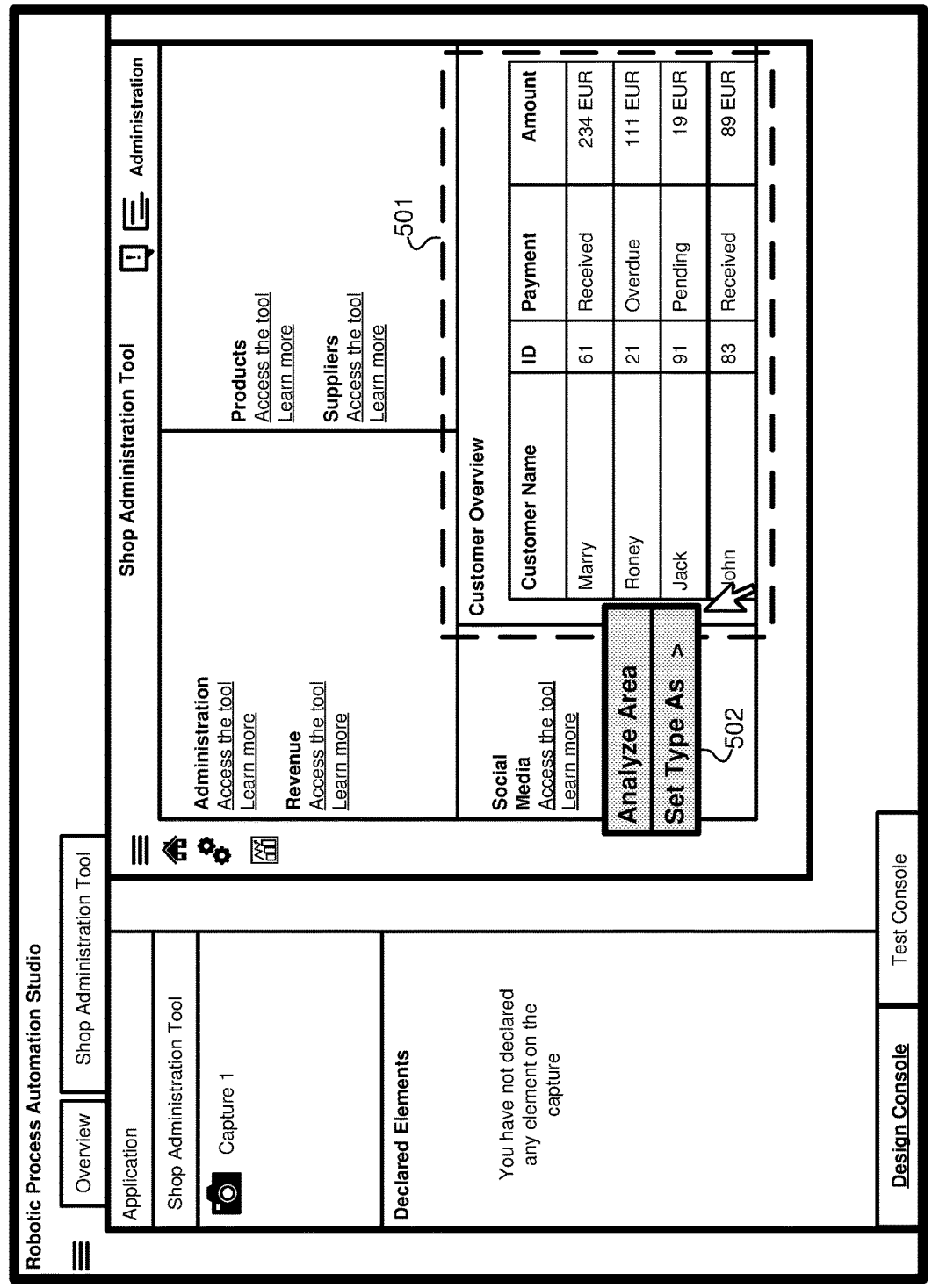
FIG. 5 shows a diagram of a context menu to analyze the selected area or set type, according to an embodiment.

FIG. 5 shows a diagram 500 of a context menu 502 to analyze the selected area or set type, according to an embodiment. The context menu 502 may appear as a result of the user right-clicking on the selected area 501. The context menu 502 includes an option to "Analyze Area" and an option to "Set Type As". Selection of "Analyze Area" will provide the area to a document information extraction machine learning model to automatically identify elements in the UI to be used for RPA. The "Set Type As" selection will enable the user to manually define the type of the area to be used for RPA.

FIG. 6 shows a diagram 600 of selection menu 601 for user interface elements automatically identified by inputting the selected area of the screenshot to a document information extraction machine learning model, according to an embodiment. The selection menu 601 is popup display including the identified elements which the user can select to be defined as RPA elements to be interacted with by an RPA robot. In this case, the user has selected "Header—Customer Name", "Header—ID", "Header—Payment", and "Cell". The "Header-Amount" element is not selected. The user can process the button "Declare" 602 to declare the selected elements as RPA elements.

FIG. 7 shows a diagram 700 of the shop administration tool user interface with the UI elements that were selected in the menu being highlighted with bold lining indicating that they were declared as RPA elements, according to an embodiment. In this example, the Customer Name header 701 is highlighted, the ID header 702 is highlighted, the Payment header 703 is highlighted, and the cells of the table are highlighted. However, the Amount header 704 is not highlighted as it was not selected in the selection menu. As mentioned above, all of the selected UI elements are automatically declared as an RPA Element in the captured screen. The "declared elements" 705 lists these declared elements in the user interface of the RPA Studio software.

FIG. 8 shows a diagram 800 of a screen capture including a notification area 801 in the shop administration tool UI, according to an embodiment. The notification area 801 may be shown in a second screen capture (labeled "Capture 2" 802 in FIG. 8).

FIG. 9 shows a diagram 900 of a selection 901 of the notification area 902, according to an embodiment. The user can then open the context menu as discussed above and request analysis of this selected area.

FIG. 10 shows a diagram 1000 of a selection menu 1001 for some of the user interface elements which were automatically identified, according to an embodiment. The RPA Studio receives the analyze result from the document information extraction machine learning model, which received the selected area as input. Here, the "Show all Notifications" button 1002 has been automatically recognized but the cross (X) button 1003 has not been recognized. The user can manually declare these cross buttons to add them in the RPA system.

Figure 11:
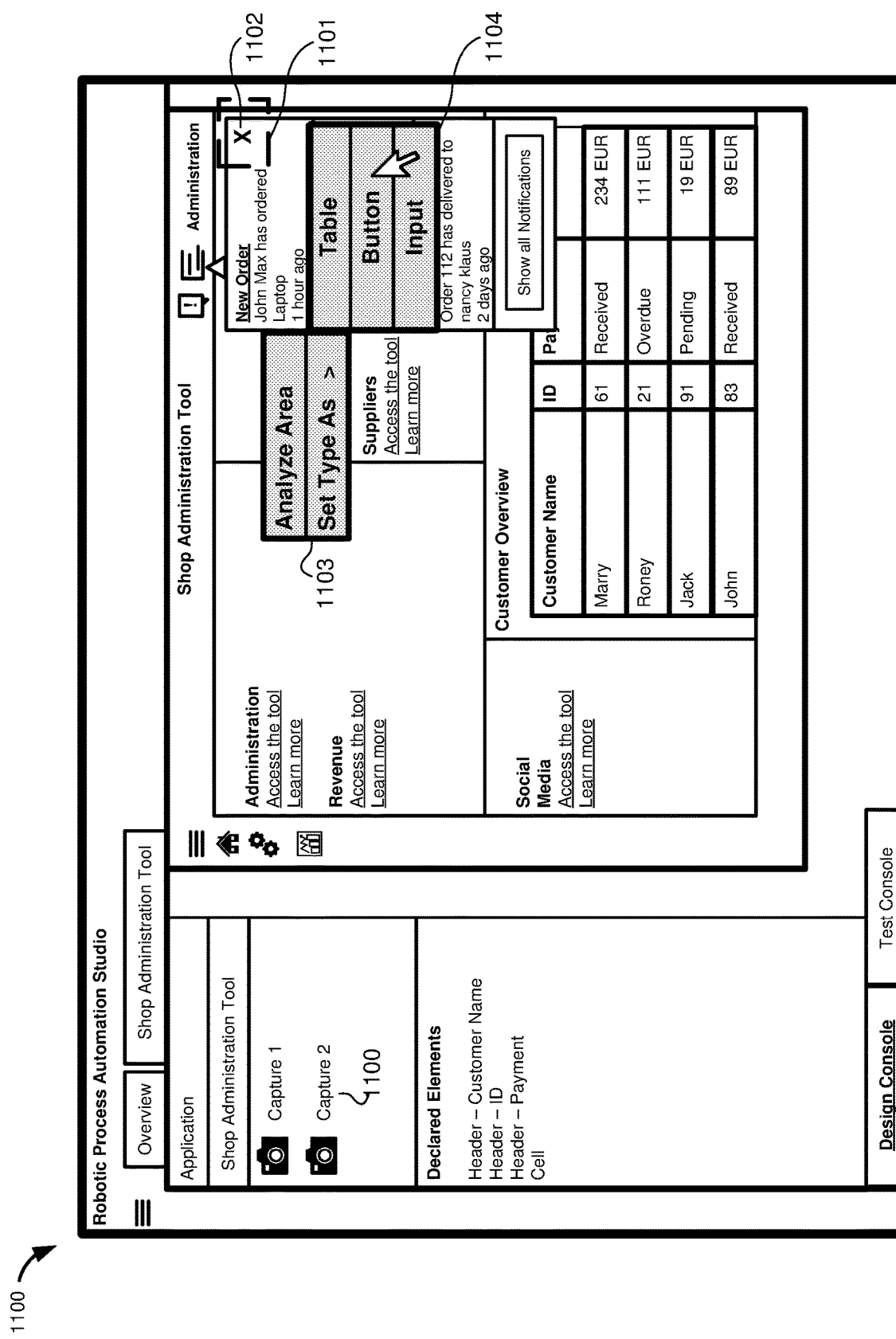
FIG. 11 shows a diagram of a selection of a previous unidentified user interface element being manually declared as a button, according to an embodiment.

FIG. 11 shows a diagram 1100 of a selection 1001 of a previous unidentified user interface element 1102 being manually declared as a button, according to an embodiment. Herein, the user selects only the "Cross Button" 1102 area. Then they open the context menu 1103 and select "Set Type As", which presents a submenu 1104. Then the user selects "Button" to have this button automatically recognized by the RPA studio each time this cross button appears in an image.

FIG. 12 shows a diagram 1200 of the button 1202, which was manually declared now being automatically identified, according to an embodiment. In diagram 1200, the user has again selected again the "Notification" area and has request a new analysis. As shown in the selection menu 1201, the "cross-button" 1202 appears in the results. The user can select the cross buttons and declare them as RPA elements.

FIG. 13 shows a diagram 1300 of the shop administration tool UI with the UI elements that were selected in the menu being highlighted with bold lining indicating that they were declared as RPA elements, according to an embodiment. As shown in diagram 1300, the cross buttons 1301, 1302, and 1302 are highlighted, along with the "Show all Notifications" button 1304, indicating that they are declared as RPA elements in the RPA Studio software.

Example Hardware

Figure 14:
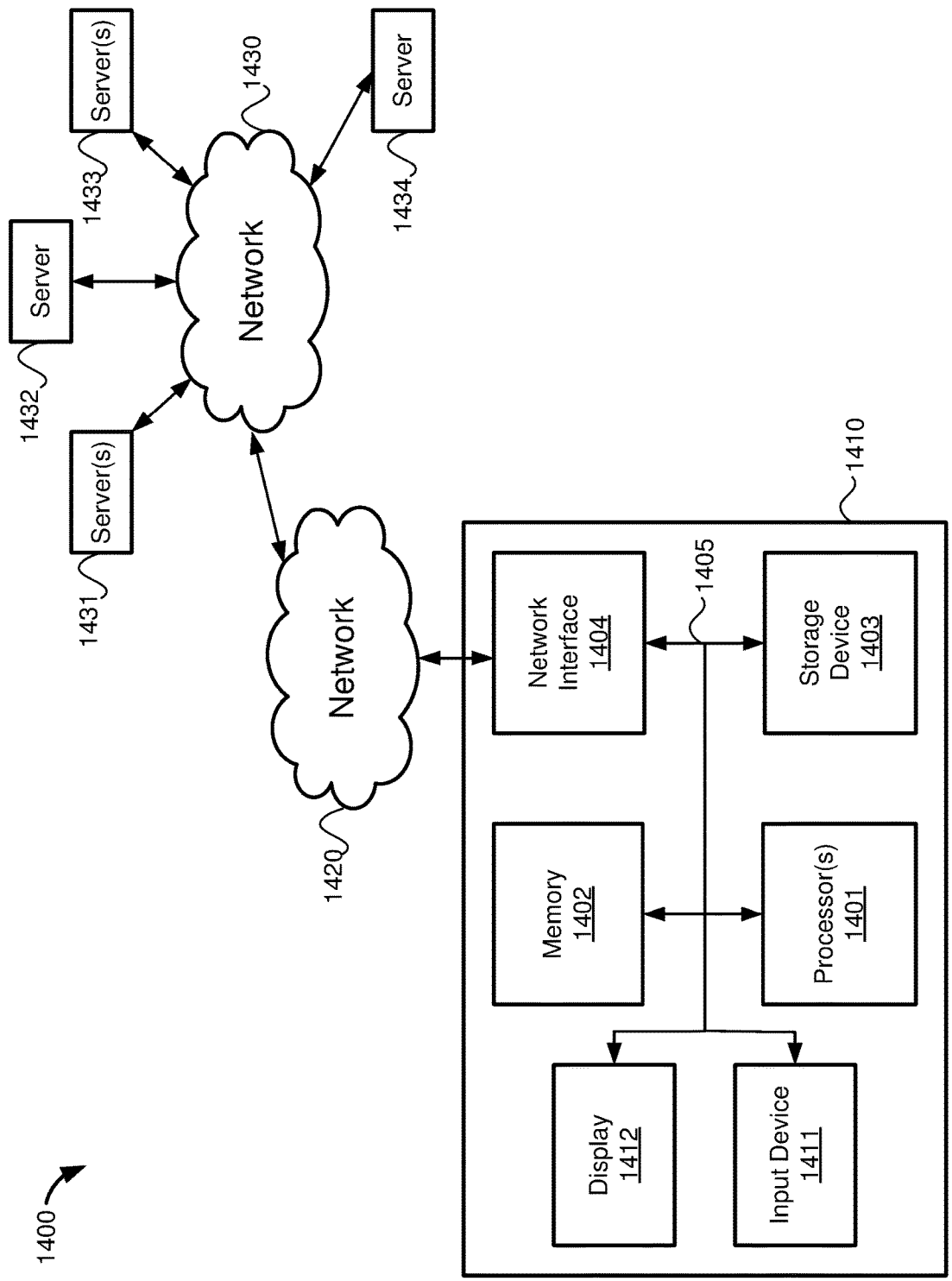
FIG. 14 shows a diagram of hardware of a special purpose computing machine for implementing systems and methods described herein.

FIG. 14 shows a diagram 1400 of hardware of a special purpose computing machine for implementing systems and methods described herein. The following hardware description is merely one example. It is to be understood that a variety of computers topologies may be used to implement the above described techniques. The hardware shown in FIG. 14 may be used to implement the computer systems and computer software (computer reprogram code) described herein.

The computer system 1410 includes a bus 1405 or other communication mechanism for communicating information, and one or more processor(s) 1401 coupled with bus 1405 for processing information. The computer system 1410 also includes a memory 1402 coupled to bus 1405 for storing information and instructions to be executed by processor 1401, including information and instructions for performing some of the techniques described above, for example. This memory may also be used for storing programs executed by processor(s) 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1403 may include source code, binary code, or software files for performing the techniques above, for example. Storage device and memory are both examples of non-transitory computer readable storage mediums.

The computer system 1410 may be coupled via bus 1405 to a display 1412 for displaying information to a computer user. An input device 1411 such as a keyboard, touchscreen, and/or mouse is coupled to bus 1405 for communicating information and command selections from the user to processor 1401. The combination of these components allows the user to communicate with the system. In some systems, bus 1405 represents multiple specialized buses, for example.

The computer system also includes a network interface 1404 coupled with bus 1405. The network interface 1404 may provide two-way data communication between computer system 1410 and a network 1420. The network interface 1404 may be a wireless or wired connection, for example. The network 1420 may be a local area network or an intranet, for example. The computer system 1410 can send and receive information through the network interface 1404, across the network 1420, to computer systems connected to the Internet 1430. Using the Internet 1430 the computer system 1410 may access data and features that reside on multiple different hardware servers 1431-1434. The servers 1431-1434 may be part of a cloud computing environment in some embodiments.

Example Embodiments

Various example embodiments implementing the techniques discussed above are described below.

Some embodiments provide a computer system, comprise one or more processors and one or more machine-readable medium coupled to the one or more processors. The machine-readable medium store computer program code comprising sets instructions executable by the one or more processors. The instructions are executable to capture a screenshot of a first user interface of a first application. The screenshot includes one or more user interface elements displayed by the first application. The instructions are further executable to display the screen shot in a second user interface of a second application. The instructions are further executable to determine a selection of an area of the screenshot. The selection is made using the second user interface. The area including the one or more user interface elements. The instructions are further executable to provide the area of the screenshot as input to a document information extraction machine learning model configured to output labels and coordinates for the one or more user interface elements. The instructions are further executable to identify, using the labels and bounding boxes output from the document information extraction machine learning model, labels for respective user interface elements of the one or more user interface elements and a respective set of coordinates for each of the one or more user interface elements. The respective set of coordinates locate the corresponding user interface element within the screenshot. The instructions are further executable to declare the one or more user interface elements and respective criteria for the one or more elements as one or more robotic process automation entities in a robotic process automation object model. The respective criteria for a particular user interface element including the respective label and the respective set of coordinates for the particular user interface element. The instructions are further executable to assign one or more actions to the one or more robotic process automation elements. The instructions are further executable to perform the one or more actions on the first application based on the respective criteria for the one or more robotic process automation elements.

In some embodiments of the computer system, the computer program code further comprises sets instructions executable by the one or more processors to determine a second selection of a second area of a second screenshot of the first application, the selection made using the second user interface, determine a label for the second area based on input to the second user interface, and declare the second area as a robotic process automation entity in the robotic process automation object model using the label and coordinates of the second area.

In some embodiments of the computer system, the machine learning model is trained to recognize the second area and output the label and the coordinates of the second area.

In some embodiments of the computer system, the computer program code further comprises sets instructions executable by the one or more processors to obtain one or more selections of respective user interface elements of the one or more user interface elements from a selection menu of the labels in a dialog on the second user interface, wherein the one or more user interface declared as one or more robotic process automation entities are based on the one or more selections.

In some embodiments of the computer system, the first application is a remote application accessed using remote desktop software, the remote application executing on a remote computer.

In some embodiments of the computer system, the one or more user interface elements include a table, a table header, a table column header, a table row, a table cell, a button, an input field, a menu, a tool bar, an icon, a tab, a text box, a list box, a check box, a window, or a dialog.

In some embodiments of the computer system, the document information extraction machine learning model is a long short-term memory recurrent neural network.

Some embodiments provide one or more non-transitory computer-readable medium storing computer program code comprising sets of instructions. The computer program code comprises sets of instructions to capture a screenshot of a first user interface of a first application. The screenshot includes one or more user interface elements displayed by the first application. The computer program code further comprises sets of instructions to display the screen shot in a second user interface of a second application. The computer program code further comprises sets of instructions to determine a selection of an area of the screenshot, the selection made using the second user interface, the area including the one or more user interface elements. The computer program code further comprises sets of instructions to provide the area of the screenshot as input to a document information extraction machine learning model configured to output labels and coordinates for the one or more user interface elements. The computer program code further comprises sets of instructions to identify, using the labels and bounding boxes output from the document information extraction machine learning model, labels for respective user interface elements of the one or more user interface elements and a respective set of coordinates for each of the one or more user interface elements. The respective set of coordinates locating the corresponding user interface element within the screenshot. The computer program code further comprises sets of instructions to declare the one or more user interface elements and respective criteria for the one or more elements as one or more robotic process automation entities in a robotic process automation object model. The respective criteria for a particular user interface element including the respective label and the respective set of coordinates for the particular user interface element. The computer program code further comprises sets of instructions to assign one or more actions to the one or more robotic process automation elements. The computer program code further comprises sets of instructions to perform the one or more actions on the first application based on the respective criteria for the one or more robotic process automation elements.

In some embodiments of the non-transitory computer-readable medium, the computer program code further comprises sets of instructions to determine a second selection of a second area of a second screenshot of the first application, the selection made using the second user interface, determine a label for the second area based on input to the second user interface, and declare the second area as a robotic process automation entity in the robotic process automation object model using the label and coordinates of the second area.

In some embodiments of the non-transitory computer-readable medium, the machine learning model is trained to recognize the second area and output the label and the coordinates of the second area.

In some embodiments of the non-transitory computer-readable medium, the computer program code further comprises sets of instructions to obtain one or more selections of respective user interface elements of the one or more user interface elements from a selection menu of the labels in a dialog on the second user interface, wherein the one or more user interface declared as one or more robotic process automation entities are based on the one or more selections.

In some embodiments of the non-transitory computer-readable medium, the first application is a remote application accessed using remote desktop software, the remote application executing on a remote computer.

In some embodiments of the non-transitory computer-readable medium, the one or more user interface elements include a table, a table header, a table column header, a table row, a table cell, a button, an input field, a menu, a tool bar, an icon, a tab, a text box, a list box, a check box, a window, or a dialog.

In some embodiments of the non-transitory computer-readable medium, the document information extraction machine learning model is a long short-term memory recurrent neural network.

Some embodiments provide a computer-implemented method. The method comprises capturing a screenshot of a first user interface of a first application. The screenshot including one or more user interface elements displayed by the first application. The method further comprises displaying the screen shot in a second user interface of a second application. The method further comprises determining a selection of an area of the screenshot. The selection made using the second user interface, the area including the one or more user interface elements. The method further comprises providing the area of the screenshot as input to a document information extraction machine learning model configured to output labels and coordinates for the one or more user interface elements. The method further comprises identifying, using the labels and bounding boxes output from the document information extraction machine learning model, labels for respective user interface elements of the one or more user interface elements and a respective set of coordinates for each of the one or more user interface elements. The respective set of coordinates locating the corresponding user interface element within the screenshot. The method further comprises declaring the one or more user interface elements and respective criteria for the one or more elements as one or more robotic process automation entities in a robotic process automation object model. The respective criteria for a particular user interface element including the respective label and the respective set of coordinates for the particular user interface element. The method further comprises assigning one or more actions to the one or more robotic process automation elements. The method further comprises performing the one or more actions on the first application based on the respective criteria for the one or more robotic process automation elements.

In some embodiments of the method, it further comprises determining a second selection of a second area of a second screenshot of the first application, the selection made using the second user interface, determining a label for the second area based on input to the second user interface, and declaring the second area as a robotic process automation entity in the robotic process automation object model using the label and coordinates of the second area.

In some embodiments of the method, the machine learning model is trained to recognize the second area and output the label and the coordinates of the second area.

In some embodiments of the method, it further comprises obtaining one or more selections of respective user interface elements of the one or more user interface elements from a selection menu of the labels in a dialog on the second user interface, wherein the one or more user interface declared as one or more robotic process automation entities are based on the one or more selections.

In some embodiments of the method, the first application is a remote application accessed using remote desktop software, the remote application executing on a remote computer.

In some embodiments of the method, the one or more user interface elements include a table, a table header, a table column header, a table row, a table cell, a button, an input field, a menu, a tool bar, an icon, a tab, a text box, a list box, a check box, a window, or a dialog.

In some embodiments of the method, the document information extraction machine learning model is a long short-term memory recurrent neural network.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
capture a screenshot of a first user interface of a first application, the screenshot including one or more user interface elements displayed by the first application;
display the screen shot in a second user interface of a second application;
determine a selection of an area of the screenshot, the selection made using the second user interface, the area including the one or more user interface elements;
provide the area of the screenshot as input to a document information extraction machine learning model configured to output labels and coordinates for the one or more user interface elements;
identify, using the labels and coordinates output from the document information extraction machine learning model, labels for respective user interface elements of the one or more user interface elements and a respective set of coordinates for each of the one or more user interface elements, the respective set of coordinates locating the corresponding user interface element within the screenshot;
declare the one or more user interface elements and respective criteria for the one or more elements as one or more robotic process automation entities in a robotic process automation object model, the respective criteria for a particular user interface element including the respective label and the respective set of coordinates for the particular user interface element;
assign one or more actions to the one or more robotic process automation elements; and
perform the one or more actions on the first application based on the respective criteria for the one or more robotic process automation elements.

2. The computer system of claim 1, wherein the computer program code further comprises sets instructions executable by the one or more processors to:
determine a second selection of a second area of a second screenshot of the first application, the selection made using the second user interface;
determine a label for the second area based on input to the second user interface; and
declare the second area as a robotic process automation entity in the robotic process automation object model using the label and coordinates of the second area.

3. The computer system of claim 2, wherein the machine learning model is trained to recognize the second area and output the label and the coordinates of the second area.

4. The computer system of claim 1, wherein the computer program code further comprises sets of instructions executable by the one or more processors to:
obtain one or more selections of respective user interface elements of the one or more user interface elements from a selection menu of the labels in a dialog on the second user interface, wherein the one or more user interface declared as one or more robotic process automation entities are based on the one or more selections.

5. The computer system of claim 1, wherein the first application is a remote application accessed using remote desktop software, the remote application executing on a remote computer.

6. The computer system of claim 1, wherein the one or more user interface elements include a table, a table header, a table column header, a table row, a table cell, a button, an input field, a menu, a tool bar, an icon, a tab, a text box, a list box, a check box, a window, or a dialog.

7. The computer system of claim 1, wherein the document information extraction machine learning model is a long short-term memory recurrent neural network.

8. One or more non-transitory computer-readable medium storing computer program code comprising sets of instructions to:
capture a screenshot of a first user interface of a first application, the screenshot including one or more user interface elements displayed by the first application;
display the screen shot in a second user interface of a second application;

determine a selection of an area of the screenshot, the selection made using the second user interface, the area including the one or more user interface elements;

provide the area of the screenshot as input to a document information extraction machine learning model configured to output labels and coordinates for the one or more user interface elements;

identify, using the labels and coordinates output from the document information extraction machine learning model, labels for respective user interface elements of the one or more user interface elements and a respective set of coordinates for each of the one or more user interface elements, the respective set of coordinates locating the corresponding user interface element within the screenshot;

declare the one or more user interface elements and respective criteria for the one or more elements as one or more robotic process automation entities in a robotic process automation object model, the respective criteria for a particular user interface element including the respective label and the respective set of coordinates for the particular user interface element;

assign one or more actions to the one or more robotic process automation elements; and perform the one or more actions on the first application based on the respective criteria for the one or more robotic process automation elements.

9. The non-transitory computer-readable medium of claim 8, wherein the computer program code further comprises sets of instructions to:

determine a second selection of a second area of a second screenshot of the first application, the selection made using the second user interface;

determine a label for the second area based on input to the second user interface; and declare the second area as a robotic process automation entity in the robotic process automation object model using the label and coordinates of the second area.

10. The non-transitory computer-readable medium of claim 9, wherein the machine learning model is trained to recognize the second area and output the label and the coordinates of the second area.

11. The non-transitory computer-readable medium of claim 8, wherein the computer program code further comprises sets of instructions to:

obtain one or more selections of respective user interface elements of the one or more user interface elements from a selection menu of the labels in a dialog on the second user interface, wherein the one or more user interface declared as one or more robotic process automation entities are based on the one or more selections.

12. The non-transitory computer-readable medium of claim 8, wherein the first application is a remote application accessed using remote desktop software, the remote application executing on a remote computer.

13. The non-transitory computer-readable medium of claim 8, wherein the one or more user interface elements include a table, a table header, a table column header, a table row, a table cell, a button, an input field, a menu, a tool bar, an icon, a tab, a text box, a list box, a check box, a window, or a dialog.

14. The non-transitory computer-readable medium of claim 8, wherein the document information extraction machine learning model is a long short-term memory recurrent neural network.

15. A computer-implemented method, comprising:

capturing a screenshot of a first user interface of a first application, the screenshot including one or more user interface elements displayed by the first application;

displaying the screen shot in a second user interface of a second application;

determining a selection of an area of the screenshot, the selection made using the second user interface, the area including the one or more user interface elements;

providing the area of the screenshot as input to a document information extraction machine learning model configured to output labels and coordinates for the one or more user interface elements;

identifying, using the labels and coordinates output from the document information extraction machine learning model, labels for respective user interface elements of the one or more user interface elements and a respective set of coordinates for each of the one or more user interface elements, the respective set of coordinates locating the corresponding user interface element within the screenshot;

declaring the one or more user interface elements and respective criteria for the one or more elements as one or more robotic process automation entities in a robotic process automation object model, the respective criteria for a particular user interface element including the respective label and the respective set of coordinates for the particular user interface element;

assigning one or more actions to the one or more robotic process automation elements; and performing the one or more actions on the first application based on the respective criteria for the one or more robotic process automation elements.

16. The computer-implemented method of claim 15, further comprising:

determining a second selection of a second area of a second screenshot of the first application, the selection made using the second user interface;

determining a label for the second area based on input to the second user interface; and declaring the second area as a robotic process automation entity in the robotic process automation object model using the label and coordinates of the second area.

17. The computer-implemented method of claim 16, wherein the machine learning model is trained to recognize the second area and output the label and the coordinates of the second area.

18. The computer-implemented method of claim 15, further comprising:

obtaining one or more selections of respective user interface elements of the one or more user interface elements from a selection menu of the labels in a dialog on the second user interface, wherein the one or more user interface declared as one or more robotic process automation entities are based on the one or more selections.

19. The computer-implemented method of claim 15, wherein the first application is a remote application accessed using remote desktop software, the remote application executing on a remote computer.

20. The computer-implemented method of claim 15, wherein the one or more user interface elements include a table, a table header, a table column header, a table row, a table cell, a button, an input field, a menu, a tool bar, an icon, a tab, a text box, a list box, a check box, a window, or a dialog.

* * * * *